(12) United States Patent
Hang (10) Patent No.: US 7,961,757 B2
(45) Date of Patent: Jun. 14, 2011

(54) DEVICE AND METHOD FOR INTERFACING TO ADVANCED SWITCHING PLATFORM

(75) Inventor: Xiaoyan Hang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 946 days.

(21) Appl. No.: 11/505,954

(22) Filed: Aug. 18, 2006

(65) Prior Publication Data

US 2007/0041389 A1 Feb. 22, 2007

Related U.S. Application Data (63) Continuation of application No. PCT/CN2005/001346, filed on Aug. 29, 2005.

(30) Foreign Application Priority Data

Aug. 29, 2004 (CN) .......................... 2004 1 0076717

(51) Int. Cl.
*H04J 3/24* (2006.01)
(52) U.S. Cl. .......................... 370/474; 370/537; 370/907
(58) Field of Classification Search .................. 370/466, 370/352, 355, 235, 474, 401, 537, 907; 455/62; 709/226
See application file for complete search history.

(56) References Cited

U.S. PATENT DOCUMENTS

| | | | | |
|---|---|---|---|---|
| 6,006,069 A | * | 12/1999 | Langston | 455/62 |
| 6,618,356 B1 | * | 9/2003 | Bonaventure | 370/235 |
| 2001/0012288 A1 | * | 8/2001 | Yu | 370/352 |
| 2003/0074449 A1 | * | 4/2003 | Smith et al. | 709/226 |

OTHER PUBLICATIONS

Gudmundson J: "Connect PCI express Subsystems with Advanced Switching Fabrics", Internet Citation, [Online], May 10, 2004, XP002377103 retrieved from the Internet: URL:http://www.elecdesign.com/Articles/ArticleID/7895/7895.html> retrieved on Apr. 13, 2006, pp. 1-3, figure 3.

"Fabrics and Application Characteristics for Advancedtca Architrectures" Intel Technology Journal, XX, US, vol. 7, No. 4, Nov. 14, 2003, pp. 1-14, XP002328193 [the whole document].

(Continued)

*Primary Examiner* — Derrick W Ferris
*Assistant Examiner* — Peter Cheng
(74) *Attorney, Agent, or Firm* — Conley Rose, P.C.; Grant Rodolph (57) ABSTRACT

A device and method for interfacing with an advanced switching (AS) platform is provided. In the uplink direction the device includes: a line side interface processing module, which receives SDH/SONET frames and conducts frame header searching and descrambling; a de-framing processing module, which de-frames the descrambled frames to obtain the payloads; a packaging module, which packages the obtained payloads into AS packets according to the packet format of the AS platform and transmits the AS packets to the AS platform through the AS interface processing module. In the downlink direction the device includes: an AS interface processing module, which receives AS packets switched by the AS platform; an un-packaging module, which conducts un-packaging to obtain the payloads of the AS packets; a mapping module, which maps the payloads into SDH/SONET frames; a line side interface processing module, which scrambles the SDH/SONET frames and transmits the frames to the SDH/SONET network.

17 Claims, 3 Drawing Sheets

OTHER PUBLICATIONS

Mayhew D et al.: "PCI express and advanced switching: evolutionary path to building next generation interconnects" High Performance Interconnects, 2003, Proceeding. 11$^{th}$ Symposium on Aug. 20-22, 2003, Piscataway, NJ, USA, IEEE, Aug. 20, 2003, pp. 21-29, XP010657970, ISBN: 0-7695-2012-X, sections 1.1, 2.1 and 3.

Wong, W: "Advanced Switching for PCI Express: The Future looks Fabric Fast" Electronic design, Penton Media, Cleveland, OH, US, vol. 51, No. 14, Jun. 23, 2003, pp. 36, 38, XP001163039 ISSN: 0013-4872 [the whole document].

Puranik, K.S.: "Advanced Switching Extends PCI Express", XCell Journal, XX, XX, 2003, pp. 1-3, XP002328192 [the whole document].

Solomon G., et al: "Advanced Switching Architecture" Intel Developer Forum, XX, XX, Sep. 17, 2003, pp. 1-53, XP002328190, pp. 10-15, pp. 20, 21; p. 30-p. 47.

* cited by examiner

DEVICE AND METHOD FOR INTERFACING TO ADVANCED SWITCHING PLATFORM

CROSS-REFERENCE TO RELATED APPLICATIONS

This application is a continuation of PCT Application No. PCT/CN2005/001346, filed Aug. 29, 2005, entitled, DEVICE AND METHOD FOR INTERFACING TO ADVANCED SWITCHING PLATFORM, which claims priority to Chinese Patent Application No. 200410076717.0, filed Aug. 29, 2004, all of the disclosure of which are hereby incorporated by reference in their entirety.

FIELD OF THE INVENTION

The present invention relates to interfacing techniques for traffic platforms in network communications, and more particularly, to a device and a method for implementing a Protocol Interface (PI) between Synchronous Digital Hierarchy (SDH) or Synchronous Optical Network (SONET) and an Advanced Switching (AS) platform.

BACKGROUND OF THE INVENTION

The AS is an advanced switching architecture. The primary difference between AS and a traditional switching mode is that AS uses the PCI-Express bus structure as the platform to implement a uniform switching of all kinds of traffic in the AS fabric after the processing of the traffic in different PIs, for example, the uniform processing of Ethernet traffic, ATM traffic, SDH/SONET traffic, IP traffic and etc. Thus, the AS is especially suitable for traffic processing in a Multiservice Transport Platform (MSTP).

In an existing SDH/SONET MSTP system, the processing of data traffic and processing of SDH/SONET traffic are conducted on different switching planes. By using the uniform packet switching technology, however, the AS is able to conduct a uniform switching of various kinds of traffic on one switching plane. Presently, the AS CORE has been released, which defines that the AS could connect with 128 types of PIs and each kind of traffic has a corresponding PI; and the PCI-Express refers to a serial difference bus structure, of which the rate is 2.5 Gbps at present.

Figure 1:
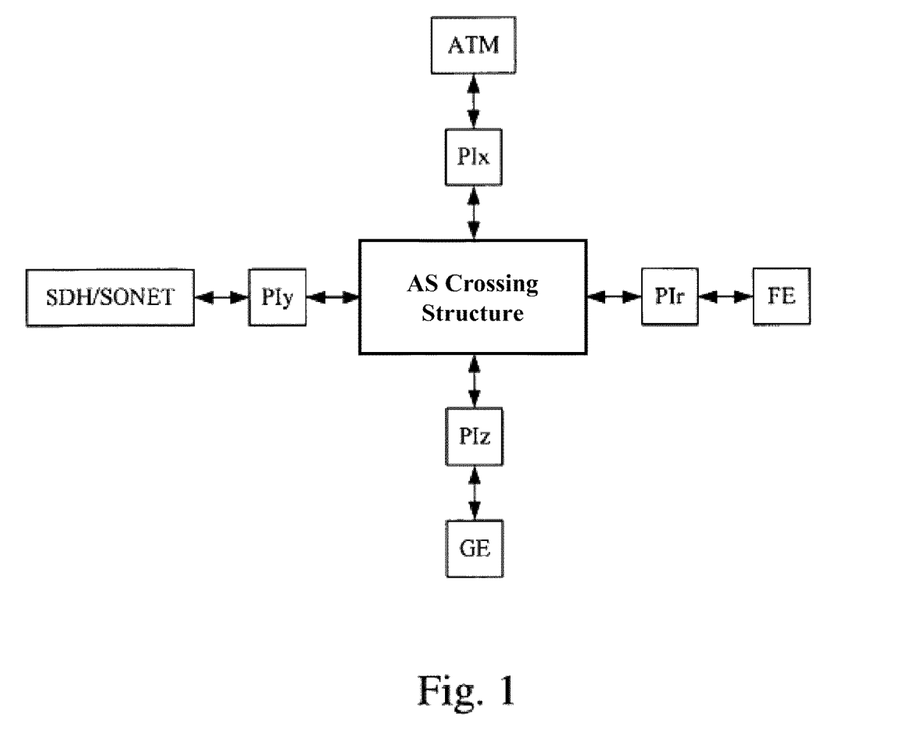
FIG. 1 is a schematic diagram illustrating the structure of an AS-based network.

The network based on the AS is depicted in FIG. 1, in which PIx, PIy, PIz and PIr are protocol processing interfaces corresponding to different traffic. The PIx corresponds to ATM traffic, the PIy corresponds to SDH/SONET traffic, the PIz corresponds to Gigabit Ethernet (GE) traffic, and the PIr corresponds to Fast Ethernet (FE) traffic, wherein x, y, z and r are all positive integers smaller than 128. The SDH/SONET, ATM, GE and FE network connect to the AS fabric through the corresponding PIs, respectively, to conduct switching operations.

SUMMARY

In view of the above, the present invention provides a device for interfacing an SDH/SONET network with an AS platform, which makes it possible to conduct traffic switching operations for the SDH/SONET traffic through the AS platform.

The device for interfacing an SDH/SONET network with the AS platform includes:

in the direction from the SDH/SONET network to the AS platform, a first line side interface processing module, which is used to receive, frame and descramble SDH/SONET frames;

a de-framing processing module, which is used to de-frame the output signal of the first line side interface processing module and obtain the payload;

a packaging module, which is used to package the payload outputted from the de-framing processing module into AS packets according to the packet format of the AS platform;

a first AS interface processing module, which is used to transmit the output AS packets of the packaging module to the switching structure of AS platform;

and in the direction from the AS platform to the SDH/SONET network, a second AS interface processing module, which is used to receive the AS packets sent from the AS platform;

an un-packaging module, which is used to unpack the AS packets received by the second AS interface processing module to obtain the payload in the AS packets;

a mapping module, which is used to map the obtained payload into SDH/SONET frames;

a second line side interface processing module, which is used to scramble the SDH/SONET frames outputted from the mapping module, and to transmit the frames to the SDH/SONET network.

In another aspect, this invention provides a method for interfacing with an AS platform, used for interfacing an SDH/SONET network with an AS platform to realize the traffic switching of the SDH/SONET traffic through the AS platform.

Such a method provided by the present invention includes the following steps:

in the direction from the SDH/SONET network to the AS platform, receiving SDH/SONET frames, searching the frame header of the SDH/SONET frames and descrambling the SDH/SONET frames;

de-framing the descrambled frames, and obtaining the payload in the frames; and packaging the obtained payload into AS packets according to the packet format of AS platform, and sending the packets to the AS platform;

and in the direction from the AS platform to the SDH/SONET network, receiving and un-packaging the AS packets after the switching of AS platform, and obtaining the payload in the AS packets;

mapping the payload to SDH/SONET frames;

scrambling the SDH/SONET frames and transmitting the frames to the SDH/SONET network.

It can be seen from the above description that the present invention provides a complete solution to the interworking between the SDH/SONET network and the AS platform, which makes it easy to switch and transfer SDH/SONET traffic via the AS platform in any granularity. Moreover, one embodiment of the present invention adds to the PI part of the data crossing function, which makes it possible to conduct a time-divided crossing for first stage packets in PIs, thus the size of buffer demanded by the middle stage crossing (i.e. the AS) is reduced, the feasibility of physical chips is greatly enhanced, and the complexity and difficulty for realizing the AS is reduced.

DETAILED DESCRIPTION OF THE EMBODIMENTS

The present invention provides a PI device and a method for interfacing a SDH/SONET network with an AS platform system, which makes it easy for the SDH/SONET traffic to access the AS platform system for processing.

The PI device according to an embodiment of the present invention could be divided into two parts: an uplink part for providing an interface from the SDH/SONET network to the AS platform and a downlink part for providing an interface from the AS platform to the SDH/SONET network. The uplink part of the PI device is used for processing the SDH/SONET traffic and then transmitting the processed SDH/SONET traffic to the AS platform system for switching, while the downlink part of the PI device is used for mapping the AS packets processed by the AS platform system into frames and then sending the frames to the SDH/SONET network for transmission.

Figure 2:
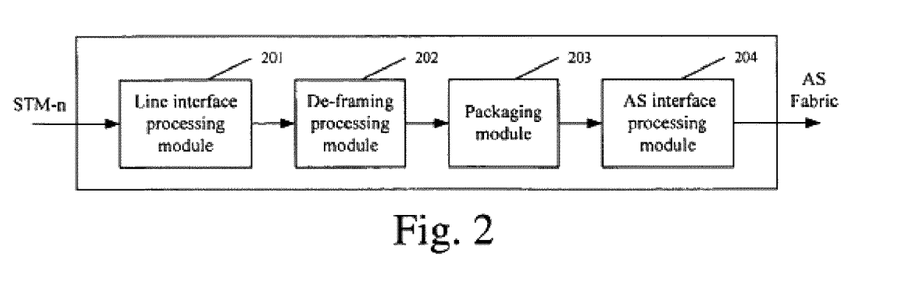
FIG. 2 is a schematic diagram illustrating the structure of an uplink part of a PI according to an embodiment of the present invention.

The structure of a PI device used for uplink processing is illustrated in FIG. 2. As shown in FIG. 2, the PI device includes:

A line side interface processing module 201, which provides an interface for SDH/SONET data frames to access the PI device, serves to implement the frame header searching and descrambling functions as well as frame aligning and B1 checkout, and may also provide the function of frame detection simultaneously.

A de-framing processing module 202, which conducts a de-framing operation to the data frames descrambled by the line side interface processing module 201 to obtain the overheads, pointer explanations, and payloads of the data frames. The processing of the overheads then includes the processing of segment overheads and path overheads. The step of obtaining the pointer explanations and the payloads is described in the following two aspects. For higher order traffic, finding out the first byte J1 of the higher order traffic by explaining pointers H1, H2 and H3. Here, an example of the higher order traffic is a VC4. And For lower order traffic, finding out the locations of bytes V1, V2, V3, and V4 via the pointer H4 by processing the higher-order path overhead, and then locating byte V5 according to the bytes V1 and V2. Thus the payloads of the lower order traffic could be extracted to a corresponding data random access memory (RAM) for packaging in the next step.

A packaging module 203, which packages the payloads of the SDH/SONET data frames obtained by de-framing according to the format of AS packets, and inserts corresponding overheads according to actual needs. For higher order traffic, the packages module 203 packages the obtained payloads, such as STS-1, STS-3(C)/VC4, and etc, to an AS packet according to an allowable format and length of the AS packet, while for lower order traffic, packages the obtained payload, such as VT1.5/NVC11, VT2/NVC12, VT3, VT6/NVC2 and etc, to an AS packet according to an allowable format and length of the AS packet.

An AS interface processing module 204, which provides an output interface from the PI device to the AS platform system, transforms the AS packets outputted by the packaging module into a format needed by the AS platform system, and sends the packets to the AS fabric for packet crossing. The AS interface processing module also provides such functions as a serial-to-parallel conversion and a level conversion. For example, some extra overheads need to be added for the SDH/SONET traffic with a rate of 2.5 Gbps after the packaging operation by the PI device in order to meet the requirement of the packet format of the AS platform system and the integrity of traffic transmission, thus the rate of the signal would be larger than 2.5 Gbps after the processing by the PI device. Since the current rate of the PCI-E is 2.5 Gbps, a serial-to-parallel conversion is needed in the AS processing interface module in order to access the AS fabric.

Figure 3:
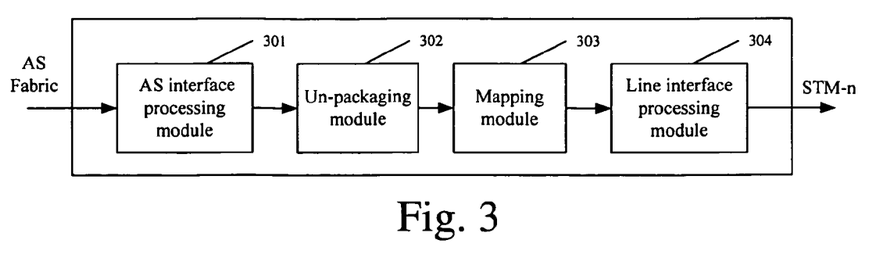
FIG. 3 is a schematic diagram illustrating the structure of a downlink part of a PI according to an embodiment of the present invention.

According to one embodiment of the present invention, the structure of a PI device used for downlink direction processing is illustrated in FIG. 3. As shown in FIG. 3, the PI device includes:

An AS interface processing module 301, which transforms the AS packets received from the AS fabric into a format required by an un-packaging module and sends the packets to the un-packaging module. The specific processing herein is a reversed processing of that in the uplink direction.

An un-packaging module 302, which un-packages the AS packets and obtains the overheads and payloads in the packets. Specifically, the un-packaging module un-packages the AS packets, then stores the obtained overheads into a corresponding RAM for reading; and stores the obtained payloads into a corresponding RAM for future use in mapping the payload to an SDH/SONET frame format.

A mapping module 303, which maps the payloads outputted by the un-packaging module 302 to SDH/SONET frames and inserts corresponding overheads.

A line side interface processing module 304, which conducts scrambling, B1 checking and other operations on the data frames outputted by the mapping module 303, and then sends the data frames to the SDH/SONET network for transmission.

Figure 4:
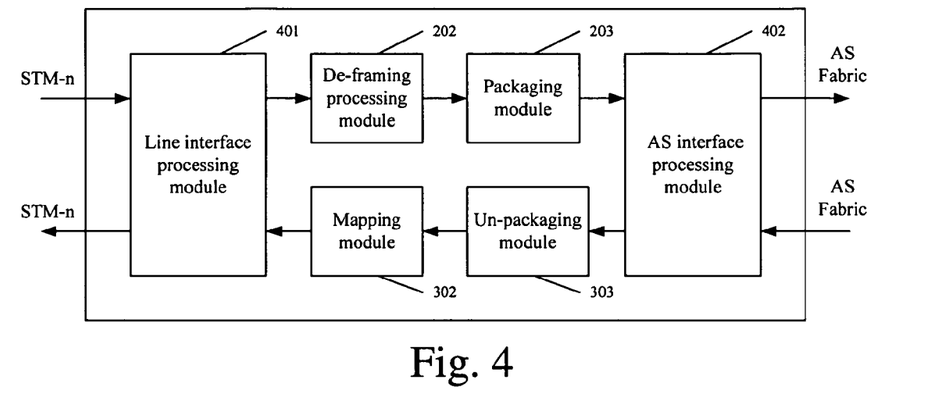
FIG. 4 is a schematic diagram illustrating the structure of a PI for both uplink and downlink processing according to an embodiment of the present invention.

In the above embodiment, traffic in the uplink and downlink directions are processed via two PI devices, respectively. Alternatively, according to another embodiment, the uplink and downlink PI devices could be integrated together, the structure of which is shown in FIG. 4. Compared to the structure of the PI devices shown in FIGS. 2 and 3, the PI device shown in FIG. 4 is different in the following aspect: at the line side, both the uplink and downlink traffic are processed uniformly by a line side interface processing module 401, which takes on the functions of the above mentioned line side interface processing modules 201 and 304 in both uplink and downlink directions; likewise, on the AS side, both the uplink and downlink traffic are uniformly processed by an AS interface processing module 402, which takes on the functions of the above mentioned AS interface processing modules 204 and 301 in both uplink and downlink directions. The other modules are the same as the above mentioned PI devices in FIG. 2 and FIG. 3, so are the functions thereof.

Based upon the above described PI device, a method for interfacing the SDH/SONET network with the AS platform is also provided, which includes the following steps:

In the uplink direction:

Receive the SDH/SONET traffic via a line side interface processing module and transmit the traffic to the de-framing processing module after descrambling; obtain payloads from the traffic and handle the overheads and pointers of the traffic by the de-framing processing module; and then package the obtained payloads into corresponding AS packets according to the AS packet format; and finally transform the AS packets to a format required by the AS platform and sent the AS packets to the AS fabric for crossing.

In the downlink direction:

Handle the AS packets received from the AS fabric by the AS interface processing module to obtain data packets in a format recognizable to the un-packaging module, and send the obtained data packets to the un-packaging module; un-package the data packets by the un-packaging module to obtain the overheads and payloads in the data packets; and then map the payloads and the corresponding overheads obtained from the un-packaging module into data frames and insert the overheads by the mapping processing module, wherein the steps of un-packaging and mapping are actually a reversed process of de-framing and packaging. Finally, scramble the data frames obtained from the mapping processing module and make the B1 processing of the data frames by the interface processing module, and send the data frames to the SDH/SONET network for transmission.

The core process in the above method is packaging and un-packaging, and detailed descriptions about the packaging strategies are given hereinafter according to preferred embodiments of the present invention.

In the packaging process, all or part of the payloads would be packaged into an AS packet according to the size of the obtained payloads. Concerning the overheads processing in the packaging process, there is already 8 bytes of fixed overheads in the AS packet according to the definition of the AS-CORE. Since the length of an AS packet is changeable, useful overheads could also be added or inserted besides the fixed overheads of the AS packet if necessary during the packaging process. Such overheads are used to ensure the integrity of signals in transmission and meet the functional requirement. Since the number of overheads only affects the actual utilization ratio and bandwidth of the packets, and since the packaging methods are the same, no other overheads except the fixed overheads would be taken into consideration in the following descriptions.

An SDH/SONET signal with the rate of 2.5 Gbps includes several kinds of traffic which could be divided into lower order traffic and higher order traffic. The lower order traffic includes, for example, 1344 VT1.5 signals or 1008 VC12 signals, which means at least 1344 or 1008 AS packets should be packaged if VT1.5 signals or VC12 lower order traffics are dispatched. As far as the higher order traffic is concerned, 48 STS-1 signals or 16 VC4 signals can be included, which would be packaged into 48 or 16 packets at least. Considering the limitation of the maximum length of an AS packet, which is 2176 bytes, how to make a suitable packaging in the PI becomes an important issue. In the following, the method of packaging the lower order traffic and the method of packaging the higher order traffic are described, respectively.

With regard to the method of packaging the lower order traffic, two preferred solutions are adopted. According to the first solution, each granule of the lower order traffic is packaged into an AS packet. According to the second solution, a granule of the lower order traffic is packaged into several AS packets. Descriptions to these two packaging methods of the lower order traffic are given as follows, taking VC12 as an example:

Solution 1: package each granule of the lower order traffic into an AS packet.

Package the lower order traffic according to the size of each VC12. In this way, a frame can be packaged into 1008 packets. After the processing by the AS interface, the packet flow is sent into the AS fabric platform system.

The advantage of this packaging method is that the utilization ratio of packet is higher, which equals to [36/(8+36)]×100%=81.82%. The disadvantage thereof is that as far as the PI device is concerned, the packaging of the first packet could not be completed almost until the whole frame is received, which leads to a long packaging time delay, and that a buffering space at least larger than 2 frames is needed, wherein one frame space is used for buffering the received data and the other frame space is used for buffering the data to be sent.

Solution 2: package a lower order traffic granule into several AS packets.

Figure 5:
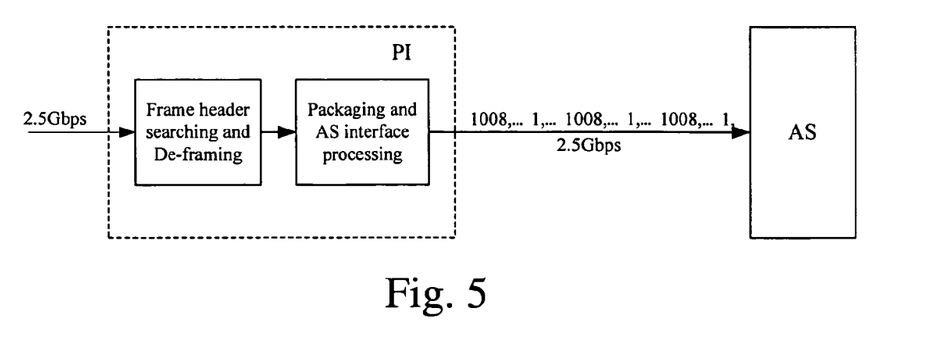
FIG. 5 is a schematic diagram illustrating the processing logic of PI according to an embodiment of the present invention.

If it is necessary to reduce the time delay due to packaging and buffering, by compromising the utilization ratio of packet, a VC12 could be mapped to several packets as shown in FIG. 5. In this way, the time delay brought by packaging, buffering and etc in the PI could be greatly reduced theoretically but at the same time a sharp reduction of the utilization ratio of packet, leads to a payload of each packet being only 36/n bytes. The utilization ratio of packet can be calculated by the following formula:

$${(36/n)/[(36/n)+8]} \times 100\%$$

wherein n is a positive integer larger than 1, representing the number of the packets.

In the following, another embodiment is further described, in which one VC12 packet is packed into 9 AS packets.

Encapsulate 4 columns of each VC12 in one row of an SDH/SONET frame into one packet, thus a VC12 will be packed into 9 packets. The packet utilization ratio equals to $\{(36/9)/[(36/9)+8]\} \times 100\% = (4/12) \times 100\% = 33.33\%$.

As shown in FIG. 5, when the packaged SDH/SONET frames in the PI access the ingress of the AS fabric at a serial rate of 2.5 Gbps, the first packets of each of the anterior 1008 VC12s are firstly transmitted to the VCs (Virtual Channel) of the AS fabric in a serial or a parallel mode, then the second packets of each VC12 are sent to the AS platform interface, and the process continues until the ninth packet of each VC12 is sent. After the crossing process in the AS fabric, the packets could be sent to posterior PIs for un-packaging, frame header searching and other operations, and then be sent to the SDH/SONET network for transmission.

While a VC12 could also be mapped into 2 packets, by which the storage space could be reduced by nearly 50% and time could be shortened by nearly 50% compared to the solution that a VC12 is packaged into one package, where the utilization ratio of packets is 69.2%. It is also possible for a VC12 to be mapped into 3, 4, 5 or more packets by the same packaging method as described above, with a reduction in the required storage space and the corresponding time delay. In the above embodiment, 9 packets mapping is chosen because the 4 columns of each VC12 in each row of the SDH frame could be packed into one packet, which is easy to be understood and implemented.

With regard to the higher order traffic, the packaging method is described as follows, by taking VC4 as an example.

Since there are 16 VC4s in one 2.5 G signal, wherein the size of each VC4 is 8+270×9=2438 byte, and the maximum packet size of an AS packet is 2176 byte, thus a VC4 has to be packaged into no less than 2 packets for crossing in the AS fabric. The specific number of packets to be packaged could be determined according to actual demands or the packet length and utilization ratio supported by actual physical chips.

Thus, the packet utilization ratio equals to $(2430/n)/(8+2430/n)$, wherein n is an integer larger than 1, representing the number of packets.

If 2 AS packets are packed, the size of each AS packet will be 8+2430/2=1223 bytes, and the utilization ratio will be 99.3%.

If 3 AS packets are packed, the size of each AS packet will be 8+2430/3=818 bytes, and the utilization ratio will be 99.02%;

. . .

If 9 AS packets are packed, the size of each AS packet will be 8+2430/9=278 bytes, and the utilization ratio will be 97.12%;

. . .

If 18 AS packets are packed, the size of each AS packet will be 8+2430/18=143 bytes, and the utilization ratio will be 94.4%;

. . .

and the rest may be inferred.

As far as the advanced traffic is concerned, because of the limitation of the actual size of packet which could be dispatched in the AS fabric, a VC4 has to be splitted into several packets. For example, if a VC4 is packaged into 18 packets in all, a VC4 signal in one row of the SDH frame will be packaged into 2 packets, and the size of each packet is 143 bytes. The specific packaging method is similar to that in the second solution to the lower order traffic described above except that there is no need to align the obtained payloads of the higher order traffic to the lower order traffic before packaging, for the alignment of payloads has been made via the pointer to the higher order before being made to the lower order. Now that the VC4 payloads have been extracted, there is no need for further alignment, thus the processing of the higher order traffic is much more convenient than that of the lower order traffic.

In summary, when the number of packets to be packaged in term of the lower order traffic or the higher order traffic is determined, it is necessary to take into account various factors, such as the size of the traffic granule dispatched by the AS fabric, the allowable time delay, the data packet utilization ratio, the maximum length of an AS packet, and the maximum packet length actually supported by physical chips.

Un-packaging is a reversed process of the above packaging process, thus no more description thereof will be given here.

In the above embodiments, since the PI device is only responsible for packaging instead of crossing, the complete crossing operation for all the packets are required to be implemented in the AS such that any time slot of any ingress could arrive at the position of any time-slot in any egress after the crossing process in the AS fabric. As a result, there should be enough storage space in the AS fabric and the higher the rate of the signal to be switched is, the larger the signal number is, and the larger the required storage space is. As far as the physical chips of AS are concerned, such requirements are difficult to meet in hardware.

Therefore, in a preferred embodiment of the present invention, some other functions such as buffering traffic, time-divided crossing or packet crossing could be added in the PI device. In this way, different kinds of traffic could be buffered and switched in different PI devices, and the traffic could be handled by several different PI devices together so as to reduce the requirement on the storage space of the AS. In practice, corresponding crossing modules could be added respectively in the uplink and downlink portion of the PI device to complete the above buffering, time-divided crossing or packet crossing process.

Specifically, there are two methods to add the above functions in the PI device. According to the first method, the packaging/un-packaging is performed before the crossing. In the aspect of hardware, the crossing module is configured before the packaging module in the uplink direction, and is configured before the un-packaging module in the downlink direction. According to the second method, the crossing is performed before the packaging/un-packaging. For hardware implemented, the crossing module is configured anterior to the packaging module in the uplink direction, and configured anterior to the un-packaging module in the downlink direction. In the uplink direction, if the packaging is performed before the crossing, the granule of the crossing will be a packet; if the crossing is performed before the packaging, the granule of the crossing will be a time slot, such as a VC12 of the lower order traffic or a VC4 of the higher order traffic. In the downlink direction, if the crossing is performed before the un-packaging, the granule of the crossing will be a packet; if the un-packaging is performed before the crossing, the granule of the crossing will be a time slot. The specific crossing method is implemented according to the rules defined by the AS-CORE.

Figure 6:
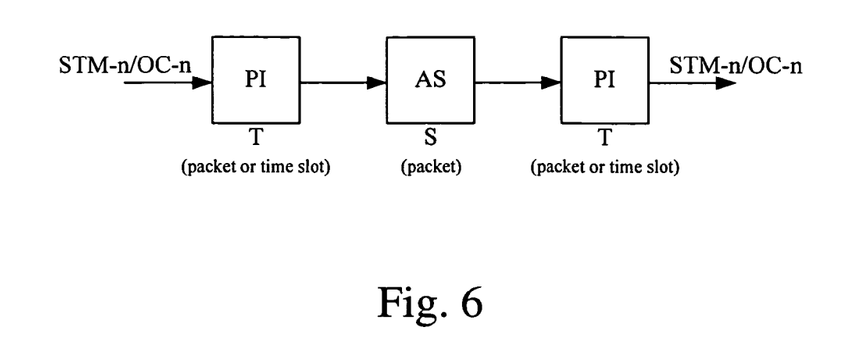
FIG. 6 is a schematic diagram illustrating a crossing process according to a preferred embodiment of the present invention.

The crossing process on the AS platform based on the above solution is shown in FIG. 6. A first stage time-slot or packet crossing of the STM-n/OC-n traffic of the SDH/SONET is completed first via the uplink PI device, then after the crossing operation in the intermediate AS fabric, a second stage time-slot or packet crossing is completed in the downlink direction. The solution is similar to that implemented by the existing time-divided-space-divided-time-divided (TST) crossing structure except that the crossing implemented is a full packet switching or a partial packet switching.

Figure 7:
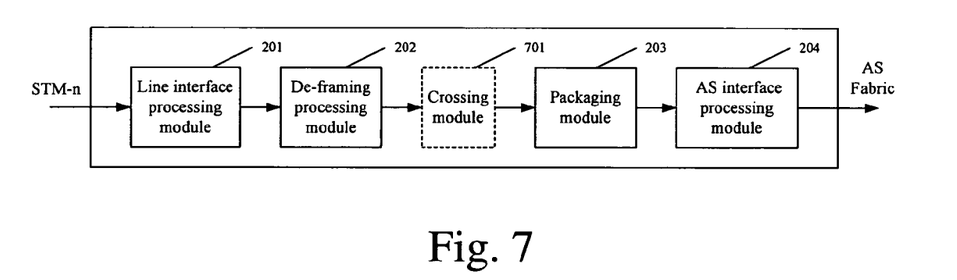
FIG. 7 is a schematic diagram illustrating the uplink structure of PI with an additional crossing function according to an embodiment of the present invention.

In the uplink direction, suppose that the crossing is performed before the packaging in the PI device, wherein the structure of the PI device is shown in FIG. 7. In this PI device, a crossing module 701 is inserted between the de-framing processing module 202 and the packaging module 203, thus the payloads of the SDH/SONET frames outputted by the de-framing processing module 202 will be sent to the packaging module 203 for packaging after a time-divided crossing operation is made on the payloads per time-slot by the crossing module.

Figure 8:
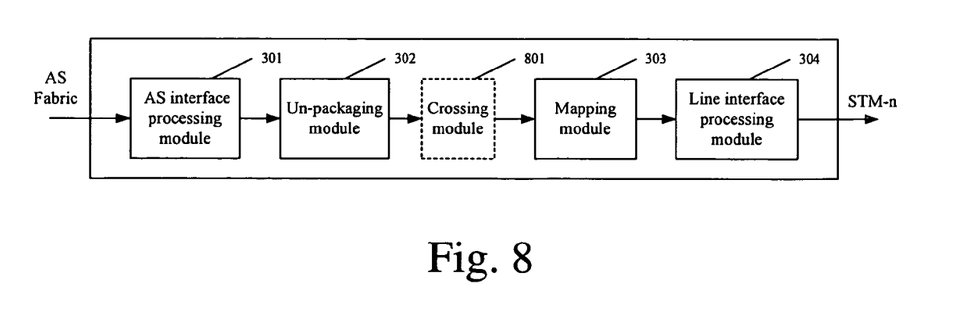
FIG. 8 is a schematic diagram illustrating the downlink structure of PI with an additional crossing function according to an embodiment of the present invention.

In the downlink direction, suppose that un-packaging is performed before the crossing in the PI device, wherein the structure of the PI device is shown in FIG. 8. In this PI device, a crossing module 801 is inserted between the un-packaging module 302 and the mapping module 303, thus the payloads outputted by the un-packaging module 302 will be sent to the mapping module 303 for processing after a time-divided crossing operation is made on the payloads per time slot.

To sum up, after being packaged and crossed in accordance with the above solutions of the present invention, all the SDH/SONET traffic could be dispatched on the AS platform.

Thus there will no problem in getting the SDH/SONET traffic accessed to the unified AS platform for traffic switching.

The foregoing are only preferred embodiments of the present invention, which should not be used to limit the scope of the present invention.

What is claimed is:

1. A device for interfacing with an advanced switching (AS) platform, used for interfacing a Synchronous Digital Hierarchy (SDH)/Synchronous Optical Network (SONET) network with an AS platform, comprising:

in the direction from the SDH/SONET network to the AS platform, a first line side interface processing module, for searching a frame header of received SDH/SONET frames and descrambling the received SDH/SONET frames;

a de-framing processing module, for de-framing signals outputted by the first line side interface processing module to obtain payloads of the SDH/SONET frames;

a packaging module, for packaging a part of the payloads which is able to be scheduled by the SDH/SONET network into one or more AS packets according to a packet format of the AS platform; and a first AS interface processing module, for sending the AS packets outputted by the packaging module to a crossing structure of the AS platform; wherein if the payloads of the SDH/SONET frames are lower order traffic, the packaging module packages each of the lower order traffic into an AS packet or the packaging module splits each of the lower order traffic into several parts and packages each part into one AS packet; if the payloads of the SDH/SONET frames are higher order traffic, the packaging module splits each of the higher order traffic into several parts and packages each part into one AS packet;

in the direction from the AS platform to the SDH/SONET network, a second AS interface processing module, for receiving AS packets sent by the AS platform;

an un-packaging module, for un-packaging the AS packets received by the second AS interface processing module and obtaining payloads of SDH/SONET frames from the AS packets;

a mapping module, for mapping the payloads into SDH/SONET frames; and a second line side interface processing module, for scrambling the SDH/SONET frames outputted by the mapping module, and transmitting the frames to the SDH/SONET network.

2. The device of claim 1, further comprising:
a crossing module, configured between the de-framing processing module and the packaging module, for performing a time-divided crossing process; or
a crossing module, configured between the packaging module and the first AS interface processing module, for performing a packet crossing process.

3. The device according to claim 2, wherein
the first line side interface processing module and the second line side interface processing module are integrated together; and
the first AS interface processing module and second AS interface processing module are integrated together.

4. The device according to claim 1, further comprising:
a crossing module, configured between the un-packaging module and the mapping module, for performing a time-divided crossing process; or a crossing module, configured between the un-packaging module and the second AS interface processing module, for performing a packet crossing process.

5. The device according to claim 4, wherein
the first line side interface processing module and the second line side interface processing module are integrated together; and
the first AS interface processing module and second AS interface processing module are integrated together.

6. The device according to claim 1, wherein
the first line side interface processing module and the second line side interface processing module are integrated together; and
the first AS interface processing module and second AS interface processing module are integrated together.

7. A method for interfacing an AS platform, used for interfacing a SDH/SONET network with an AS platform, comprising:

in the direction from the SDH/SONET network to the AS platform, receiving SDH/SONET frames, searching the frame header of the SDH/SONET frames and descrambling the SDH/SONET frames;

de-framing the descrambled frames to obtain payloads of the SDH/SONET frames; and packaging a part of the payloads which is able to be scheduled by the SDH/SONET network into one or more AS packets according to the packet format of the AS platform and transmitting the AS packets to the AS platform;

in the direction from the AS platform to the SDH/SONET network, receiving and un-packaging AS packets switched by the AS platform to obtain the payloads of SDH/SONET frames from the AS packets;

mapping the payloads into SDH/SONET frames;

scrambling the SDH/SONET frames and transmitting the frames to the SDH/SONET network;

wherein the packaging comprises: if the payloads of the SDH/SONET frames are lower order traffic, packaging each of the lower order traffic into an AS packet or splitting each or the lower order traffic into several parts, and packaging each part into one AS packet; and if the payloads of the SDH/SONET frames are higher order traffic, splitting each of the higher order traffic into several parts, and packaging each part into one AS packet.

8. The method according to claim 7, wherein the process of splitting each of the lower or higher order traffic into several parts comprises averagely splitting the traffic by columns.

9. The method according to claim 8, further comprising:
before packaging the traffic, pre-determining the number of packets into which each of the traffic is to be packaged according to at least one of the following factors: the size of granule for crossing dispatching, the allowable time delay, the data packet utilization ratio, the allowed maximum length of an AS packet, and the maximum packet length actually supported by physical chips.

10. The method according to claim 8, further comprising:
performing a time-divided crossing process of the obtained payloads per time slot before packaging the payloads; or
performing a packet crossing process of the obtained AS packets after packaging the payloads and before transmitting the packets.

11. The method according to claim 8, further comprising:
performing a packet crossing process of the received AS packets before un-packaging the received AS packets; or
performing a time-divided crossing process of the payloads obtained by un-packaging per time slot after un-packaging the received AS packets and before mapping the payloads to SDH/SONET frames.

12. The method according to claim 7, further comprising:

before packaging the traffic, pre-determining the number of packets into which each of the traffic is to be packaged according to at least one of the following factors: the size of granule for crossing dispatching, the allowable time delay, the data packet utilization ratio, the allowed maximum length of an AS packet, and the maximum packet length actually supported by physical chips.

13. The method according to claim 7, further comprising:

performing a packet crossing process of the obtained AS packets after packaging the payloads and before transmitting the packets.

14. The method according to claim 7, further comprising:

performing a time-divided crossing process of the obtained payloads per time slot before packaging the payloads.

15. The method according to claim 7, further comprising:

performing a time-divided crossing process of the payloads obtained by un-packaging per time slot after un-packaging the received AS packets and before mapping the payloads to SDH/SONET frames.

16. The method according to claim 7, further comprising:

performing a packet crossing process of the received AS packets before un-packaging the received AS packets.

17. The method according to claim 7, further comprising:

inserting useful overheads while packaging the payloads according to actual demands.

\* \* \* \* \*